US007006716B2

(12) United States Patent
Bhowmik

(10) Patent No.: US 7,006,716 B2
(45) Date of Patent: Feb. 28, 2006

(54) METHOD AND APPARATUS FOR SWITCHING AND MODULATING AN OPTICAL SIGNAL WITH ENHANCED SENSITIVITY

(75) Inventor: Achintya K. Bhowmik, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 396 days.

(21) Appl. No.: 09/955,235

(22) Filed: Sep. 17, 2001

(65) Prior Publication Data

US 2003/0053731 A1 Mar. 20, 2003

(51) Int. Cl.
*G02F 1/035* (2006.01)
*G02B 6/26* (2006.01)
*G02B 6/12* (2006.01)

(52) U.S. Cl. ................................ 385/3; 385/14; 385/15

(58) Field of Classification Search ................. 385/1–3, 385/8, 14, 16, 15, 39, 45
See application file for complete search history.

(56) References Cited

U.S. PATENT DOCUMENTS 5,627,929 A 5/1997 Vawter et al.
5,812,709 A 9/1998 Arai et al.
5,953,467 A 9/1999 Madsen
5,987,050 A * 11/1999 Doerr et al. ................ 372/108
6,222,953 B1 4/2001 Hoekstra et al.
6,266,458 B1 7/2001 Ahn et al.

FOREIGN PATENT DOCUMENTS

EP 0140578 A 5/1985
WO PCT/US02/26184 8/2002

OTHER PUBLICATIONS

Visagathilagar Y. S. et al., "Fabry–Perot Type Resonantly Enhanged Mach–Zehnder Modulator", Microwave Photonics 1999, MWP '99, International Optical Meeting On Melbourne, Vic., Australia Nov. 17–19, 1999, Piscathaway, NJ., USA, IEEE, US, Nov. 17, 1999, pp. 17–20.
International Search Report, Aug. 16, 2002.

* cited by examiner

*Primary Examiner*—John D. Lee
*Assistant Examiner*—Sarah U Song
(74) *Attorney, Agent, or Firm*—Blakely, Sokoloff, Taylor & Zafman LLP

(57) ABSTRACT

A switching device includes an optical cavity and a phase modulator disposed within the optical cavity. An optical signal is propagated into the cavity. The phase modulator can selectively introduce a phase shift between portions of the optical signals, which are then recombined and propagated out of the optical cavity. The optical cavity confines the optical signal to allow phase shifts to accumulate so that a relatively small drive power to the phase modulator can be used to achieve a relatively large phase shift.

30 Claims, 4 Drawing Sheets

METHOD AND APPARATUS FOR SWITCHING AND MODULATING AN OPTICAL SIGNAL WITH ENHANCED SENSITIVITY

TECHNICAL FIELD

This disclosure relates generally to optical signaling, and in particular but not exclusively, relates to optical switches and modulators.

BACKGROUND

Optical switches and modulators are widely used in optical communication systems. Such optical systems include waveguide (e.g., optical fibers, planar wafer-based circuits) and free-space systems, or combinations of such systems. In many applications, modulation in optical communication systems is implemented as digital modulation in which the modulator is in either an ON or OFF state, as in an optical switch. Thus, optical modulators in digital signaling systems are essentially ON/OFF optical switches.

One approach to optical switching and modulation is based on controlling the phase of portions of an optical signal to selectively control the interference between these portions. For example, in one approach, the input optical signal is split into two matched portions, then the phase difference between them is controlled, and then the portions are recombined to form the output signal. If the phase difference is 180 degrees (or some multiple thereof), then completely destructive interference occurs when the portions are recombined, resulting in output signal ideally having an intensity of zero. This configuration can be used as the OFF state of the switch or modulator. Conversely, if the phase difference is zero degrees (or some multiple of 360 degrees), then completely constructive interference occurs, resulting in the output signal having essentially the same intensity as that of the input signal. This configuration can be used as the ON state of the switch or modulator.

There are several approaches to causing the phase difference between the portions of the input optical signal. One approach is to cause a difference in refractive index of the media in which the portions are propagating, which in turn will cause a phase difference between the portions. Various electro-optic, thermo-optic and stress/strain-optic mechanisms can be used to vary the refractive index of a propagation medium.

One of the important parameters of optical switches and modulators is the power required by the optical switch or modulator to switch between ON and OFF states (i.e., the drive power requirement). In most applications, it is desirable to reduce the drive power requirements of the optical switches and modulators.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method and apparatus for switching and modulating an optical signal are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
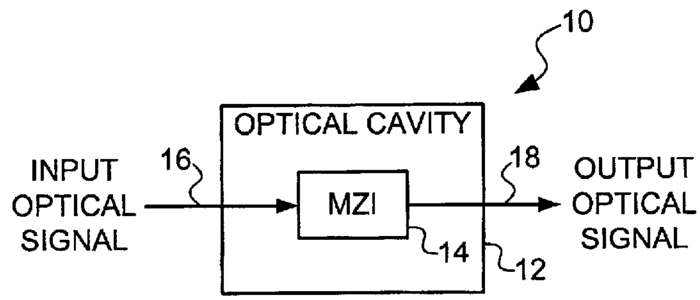
FIG. 1 is a block diagram illustrating an optical switching device, according to one embodiment of the present invention.

FIG. 1 illustrates an optical switching device 10, according to one embodiment of the present invention. Various embodiments of optical switching device 10 include optical switches and optical modulators. In this embodiment, optical switching device 10 includes an optical cavity 12 containing a phase modulator 14 having a MZI (also referred to herein as a MZI structure). In this embodiment, MZI structure 14 is configured to operate as a switch or modulator responsive to a control signal (not shown) to transition between ON and OFF states. Optical cavity 12 can be any suitable cavity structure that has at least two partially reflective surfaces or facets. In one embodiment, optical cavity 12 is a Fabry-Perot (FP) resonator for the wavelength of the optical signal to be switched.

This embodiment of optical switching device 10 operates, in general, as follows. An optical signal 16 (indicated as an arrow) is propagated into optical cavity structure 12 in which the signal is confined for multiple passes through the propagation medium. In addition, during these multiple passes, optical signal 16 propagates through MZI structure 14. In some embodiments, MZI structure 14 includes two or more propagation paths. MZI structure 14 can be controlled to selectively introduce a phase shift between optical signals propagating in the different paths to create interference when these optical signals are combined. The multiple passes through MZI structure 14 advantageously allow the relative phase shifts to accumulate. MZI structure 14 then combines the optical signals from the two paths to form an output signal. When MZI structure 14 introduces a phase shift that results in an accumulated relative phase shift of 180 degrees (or a multiple thereof), the output signal will be in the OFF state because the optical signals in the two paths will destructively interfere when combined. In contrast, when the accumulated relative phase shift is zero (or a multiple of 360 degrees), the output signal will be in the ON state because the optical signals in the two paths will constructively interfere when combined.

One advantage achieved by optical switching device 10 is a reduced drive power requirement. That is, because the phase shifts are accumulated during each pass, MZI structure 14 requires a drive power that is less than a conventional MZI switch (which provides only a single pass) to achieve the same effective relative phase difference to achieve the desired ON/OFF states.

Figure 2:
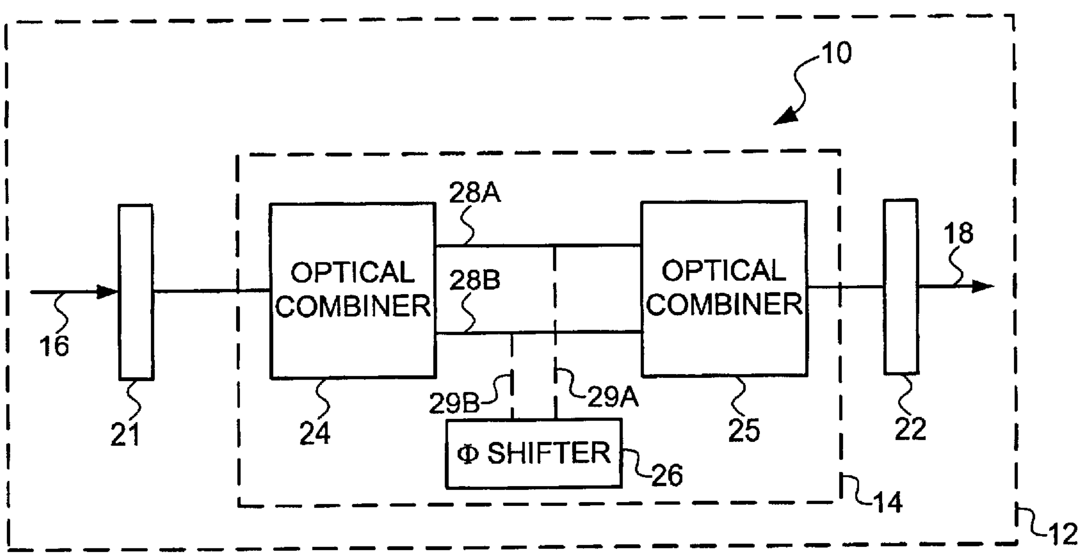
FIG. 2 is a block diagram illustrating an embodiment of the optical switching device of FIG. 1 in more detail.

FIG. 2 illustrates an embodiment of the optical switching device 10 (FIG. 1) in more detail. In this embodiment, optical cavity 12 is implemented using partially reflective facets 21 and 22. Partially reflective facets 21 and 22 can be implemented in any suitable manner such as, for example, reflective gratings (e.g. a planar diffraction grating, UV-written index grating, etc.), high reflective dielectric coatings (i.e., a coating of alternating layers of high and low refractive index material), partially silvered mirrors, etc. In some embodiments, the reflectivity of partially reflective facets 21 and 22 are matched, although in other embodiments they need not be matched. In addition, in this embodiment, the parameters of optical cavity 14 are designed so that optical cavity 14 is resonant for the wavelength of input optical signal 16.

In this embodiment, MZI structure 14 includes optical coupler 24, optical coupler 25 and a phase shifter 26. Optical couplers 24 and 25 are also referred herein as optical combiners 24 and 25. For example, optical coupler 24 can be implemented using a standard 50:50 coupler such as, for example, a Y-coupler, a beam-splitter prism, or any other optical power splitter device. Optical coupler 25 can also be a 50:50 coupler. In other embodiments, the splitters can have arbitrary power splitting ratios. Phase shifter 26 can be any suitable phase shifting device such as, for example, electro-optic, thermo-optic and stress-optic phase shifters. In this embodiment, phase shifter 26 varies the phase of an optical signal by varying the refractive index of the medium in which the optical signal is propagating. Other embodiments may use phase shifters that create phase differences using different approaches or mechanisms.

The elements of this embodiment of optical switching device 10 are interconnected as follows. Partially reflective facets 21 is connected or arranged to receive input optical signal 16. Optical coupler 24 has an input port coupled to partially reflective facet 21. That is, optical coupler 24 is coupled to receive the portion of optical signal 16 that passes through partially reflective facet 21 and the optical signals that are reflected from the surface of partially reflective facet 21 that faces optical coupler 24. Optical coupler 24 has first and second output ports respectively connected to one of the ends of optical paths or arms 28A and 28B. In some embodiments, arms 28A and 28B are matched in length, while in other embodiments they can have different lengths. Phase shifter 26 is connected to one or both of arms 28A and 28B, as indicated by dashed lines 29A and 29B. The other ends of arms 28A and 28B are connected to first and second input ports of optical coupler 25. An output port of optical coupler 25 is coupled to partially reflective facet 22. The optical signal that passes through partially reflective facet 22 forms output signal 18 of optical switching device 10.

Figure 3:
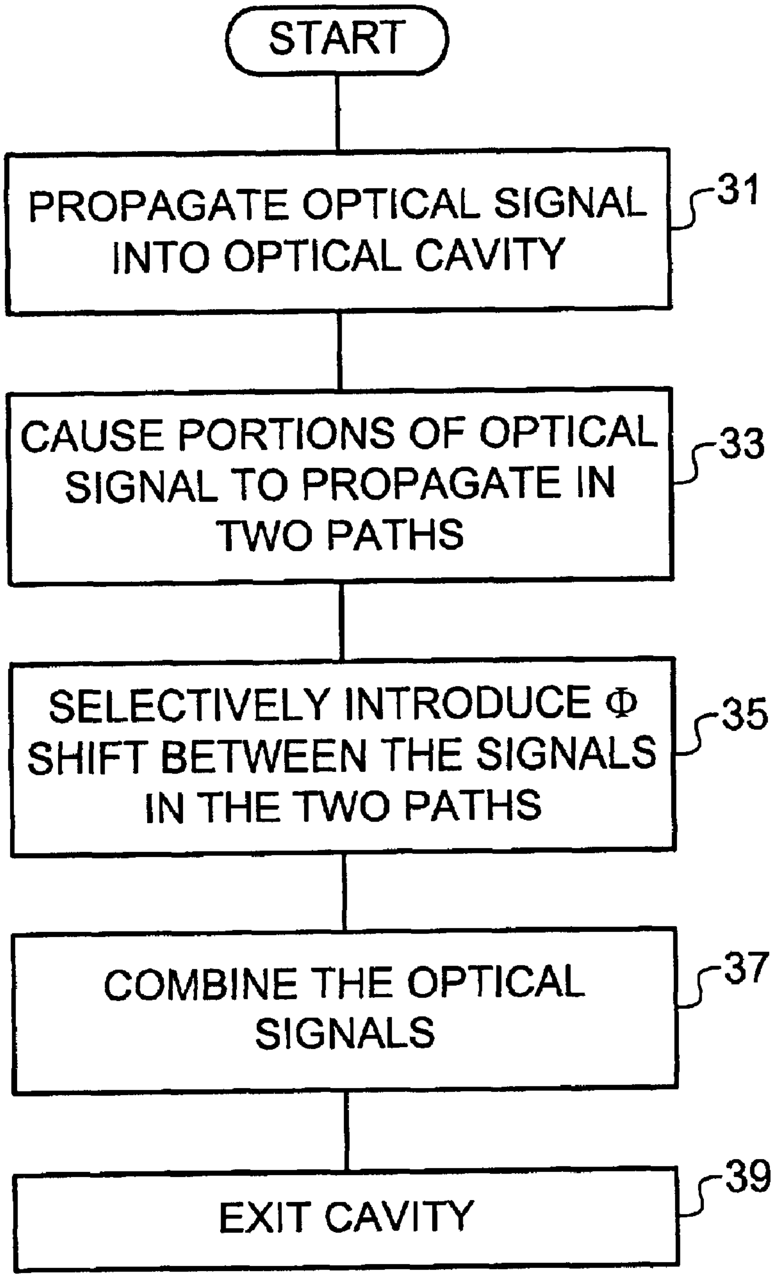
FIG. 3 is a flow diagram illustrating the operation of the optical switching device of FIG. 2, according to one embodiment of the present invention.

FIG. 3 is a flow diagram illustrating the operation of optical switching device 10 (FIG. 2), according to one embodiment of the present invention. Referring to FIGS. 2 and 3, optical switching device 10 operates as follows.

In operation, input optical signal 16 is propagated into optical cavity 14. In one embodiment, input optical signal 16 is laser light of a wavelength of 1550 nm. In other embodiments, different wavelengths can be used, typically depending on the intended end use of the device (e.g. a specific optical communication network) and the propagation medium used in the application. In this embodiment, input optical signal 16 is propagated to partially reflective facet 21. This operation is represented by a block 31 in FIG. 3.

A portion of input optical signal 16 passes through partially reflective facet 21 and propagates to optical coupler 24. In this embodiment, optical coupler 24 splits this optical signal into two component signals that are matched in phase and energy. One component signal propagates in arm 28A and the other in arm 28B. This operation is represented by a block 33 in FIG. 3. In other embodiments, the optical coupler splits the optical signal in multiple (more than two) components with dissimilar phase relations and energy ratios.

Phase shifter 26 then introduces a controlled amount of phase difference between the component signals propagating in arms 28A and 28B. Ideally, phase shifter 26 causes a relative phase shift between the component signals that effectively results in either a constructive interference of light to achieve the ON switching state or a destructive interference of light to achieve the OFF switching state when the component optical signals are later combined and exit optical cavity 14. This operation is represented by a block 35 in FIG. 3.

The component signals then propagate in arms 28A and 28B to optical coupler 25. Optical coupler 25 combines the component signals into a single optical signal. This operation is represented by a block 37 in FIG. 3.

The recombined optical signal (i.e., the output signal of optical coupler 25) then propagates to partially reflective facet 22. In this embodiment, partially reflective facet 22 allows a portion of the recombined signal to pass through. That is, the non-reflected portion of the recombined signal exits optical cavity 14 to serve as output signal 18. This operation is represented by a block 39 in FIG. 3.

However, partially reflective facet 22 also reflects a portion of the recombined optical signal to propagate back to partially reflective facet 21 via optical coupler 25, arms 28A and 28B, and optical coupler 24. More particularly, (a) optical coupler 25 splits the reflected signal to propagate in arms 28A and 28B; (b) phase shifter 26 introduces another relative phase shift between the component signals outputted by signal combiner 25; (c) optical coupler 24 combines these component signals; and (d) partially reflective facet 21 reflects a portion of the recombined output signal of optical coupler 24. This reflected portion in effect, is then operated on as described in block 31 and so on. Thus, in effect, portions of input optical signal 16 are confined in optical cavity 12 (defined by partially reflective facets 21 and 25) for multiple passes through MZI structure 14 (formed by phase shifter 26 and optical couplers 24 and 25). As a result, these portions of the optical signal can accumulate the phase shifts introduced by phase shifter 26 before exiting partially reflective facet 22.

This process can advantageously reduce the drive power requirements of optical switching device 10 by allowing the application to drive phase shifter 26 to introduce a relatively low "single-pass" phase shift that is then accumulated to achieve the desired resulting phase shift. In contrast, typical conventional optical switches and modulators require a relatively large drive power to cause phase shifter 26 to introduce a 180 degree phase shift in a single pass. The performance of one embodiment of optical switching device 10 is described below in conjunction with FIG. 5.

Figure 4:
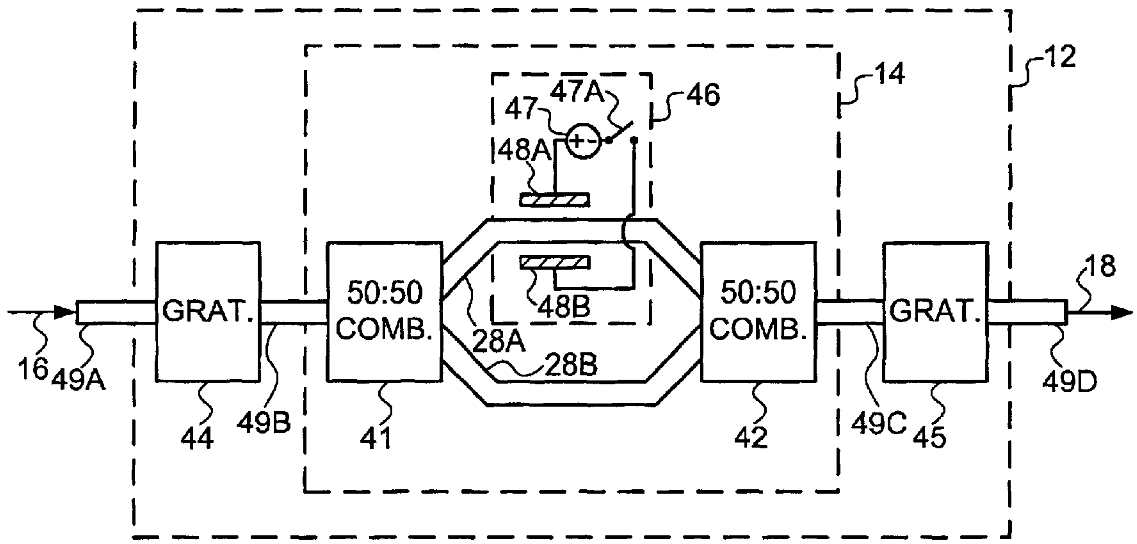
FIG. 4 is a diagram illustrating an electro-optic implementation of an optical switching device, according to one embodiment of the present invention.

FIG. 4 illustrates an electro-optic implementation of optical switching device 10 (FIG. 2), according to one embodiment of the present invention. In this embodiment, optical switching device 10 is implemented in the form of a planar integrated optical circuit wherein the optical signal travels through waveguides. More particularly, optical combiners 24 and 25 (FIG. 2) are respectively implemented with 50:50 combiners 41 and 42 (e.g., Y-couplers) in this embodiment. Partially reflective facets 21 and 22 (FIG. 2) are implemented with reflective gratings 44 and 45, respectively. In this embodiment, reflective grating 44 is designed to have a reflectivity of about 90% for the wavelength of optical input signal 16. Other reflectivities can be used in other embodiments, with phase shifting performance tending to improve with reflectivity (described in more detail below in conjunction with FIG. 6). In this embodiment, phase shifter 26 (FIG. 2) is implemented with an electro-optic phase shifter 46, which includes a voltage source 47, a switch 47A, a first electrode 48A and a second electrode 48B.

Further, a waveguide 49 (which includes sections 49A, 49B, 49C and 49D and arms 28A and 28B) is used to propagate the optical signals within this embodiment of optical switching device 10. In this embodiment, waveguide 49 is implemented as a planar waveguide having a $LiNbO_3$ propagation medium. In other embodiments, different propagation mediums can be used that are transparent to the optical signal being used in the application can be used and have reflective indices that vary when subjected to varying electromagnetic field. For example, the refractive index of $LiNbO_3$ varies with electric field strength.

The elements of this embodiment of optical switching device 10 are interconnected as follows. Waveguide section 49A is connected to receive optical signal 16. For example, an optic fiber may be coupled to the planar integrated optical circuit that contains optical switching device 10 to propagate optical signal 16 to waveguide section 49A. Reflective grating 44 is formed between waveguide sections 49A and 49B to form one partially reflective end of optical cavity 12. Optical combiner 41 is connected to the other end of waveguide section 49B and to arms 28A and 28B. Optical combiner 42 is connected to the other ends of arms 28A and 28B and waveguide section 49C. Reflective grating 45 is formed between waveguide sections 49C and 49D to form the other reflective end of optical cavity 12.

Further, the elements of electro-optic phase 46 are operatively coupled to arm 28A as follows. Voltage source 47 has one output terminal connected to electrode 48A and the other connected to a terminal of switch 47A. Another terminal of switch 47A is connected to electrode 48B. Electrodes 48A and 48B are arranged near arm 28A so that when switch 47A is closed, arm 28A is within the electric field created between electrodes 48A and 48B. In an alternative embodiment, electro-optic phase shifter 46 can include two more electrodes (not shown) similarly arranged near arm 28B but in the opposite polarity.

This embodiment of optical switch device 10 operates in substantially the same manner as described above in conjunction with FIGS. 2 and 3. However, more particularly, electro-optic phase shifter operates as follows to introduce a phase shift between component optical signals propagating in arms 28A and 28B.

Electro-optic phase shifter 46 selectively introduces a phase shift in any optical signal propagating in arm 28A. In this embodiment, electro-optic phase shifter 46 creates an electric field between electrodes 48A and 48B when switch 47A is closed. As shown in FIG. 4, arm 28A is disposed between electrodes 48A and 48B. The electric field causes a change in the refractive index of the $LiNbO_3$ in arm 28A that is related to the strength and polarity of the electric field (relative to the direction of propagation). Because the propagation speed of an optical signal is related to refractive index of the propagation medium, the change in refractive index in arm 28A (i.e., the portion of arm 28A within the electric field) causes a phase shift of the component signal propagating in arm 28A relative to the component signal propagating in arm 28B. For example, in one embodiment, to enter one state, optical switching device 10 can cause switch 47A to be closed to create an electric field that changes the refractive index of arm 28A. This change in refractive index in turns creates a phase difference between the component signals propagating in arms 28A and 28B.

To enter the opposite state, switch 47A is opened so that no electric field is created. In this way, there is no change in refractive index in arm 28A, resulting in the relative phases of the component signals being unchanged. If the lengths of arms 28A and 28B are equal, then there is no phase difference when the component optical signals reach an optical combiner.

Figure 5:
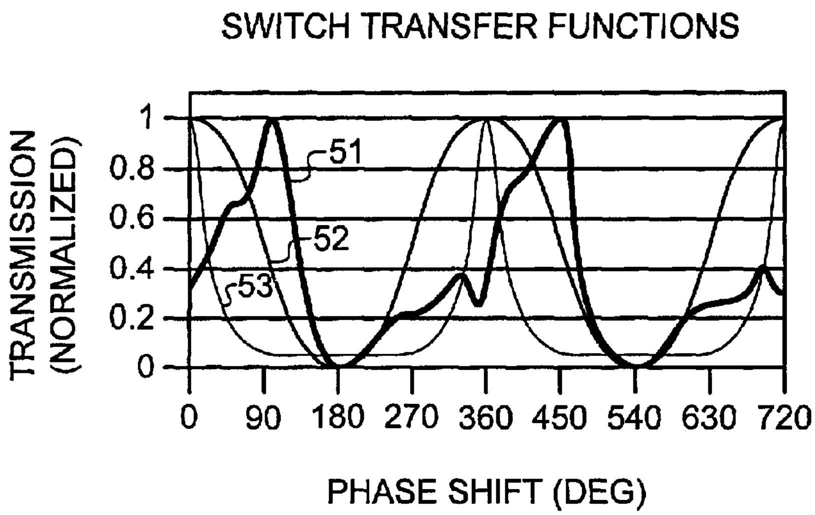
FIG. 5 is a diagram illustrating a normalized switch transfer function of an exemplary optical switching device.

FIG. 5 illustrates a normalized switch transfer function of optical switching device 10 (FIG. 4), simulated according to one embodiment of the present invention. Referring to FIGS. 4 and 5, the vertical axis of the transfer function represents the transmission ratio (i.e., the ratio power or energy of output optical signal 18 to input optical signal 16). The horizontal axis of the transfer function represents the single-pass phase shift provided by electro-optic phase shifter 46. This transfer function can also apply to other types of phase shifters. Accordingly, the transfer function serves to indicate the energy or power of output optical signal 18 as a function of the single-pass phase shift provided by the phase shifter. Because a phase shifter's single-pass phase shift is related to the drive power, FIG. 5 also indicates the energy or power of output optical signal 18 as a function of drive power.

The transfer function of this embodiment of optical switching circuit 10 is represented by a curve 51. For comparison, curves 52 and 53 are included in FIG. 5 to show the transfer functions of a conventional MZI device and a conventional FP device. As shown in FIG. 5, curve 51 has a maximum at about 90 degrees and a minimum at about 180 degrees. Thus, optical switching device 10 only requires its phase shifter to provide a single-pass phase shift of about 90 degrees to change from a maximum to a minimum (i.e., from an ON state to an OFF state). In contrast, curves 52 and 53 have maximums at zero degrees and minimums at 180 degrees. Thus, conventional MZI and FP devices require their phase shifters to provide a 180 degree phase shift to transition from an ON state to an OFF state.

In one embodiment, arms 28A and 28B of optical switching device 10 are designed with different lengths so that there is a 90 degree single-pass phase difference between the component optical signals when combined by an optical combiner. In this way, when no drive power is provided to electro-optic phase shifter 46, there is a 90 degree single-pass phase shift, resulting in a maximum transmission of output optical signal 18 (i.e., the ON state). Then, to enter the OFF state, electro-optic phase shifter 46 need only be driven to provide a single-pass phase shift of 90 degrees. Thus, optical switching device 10 achieves a significant reduction in drive power to switch between the ON and OFF states.

Figure 6:
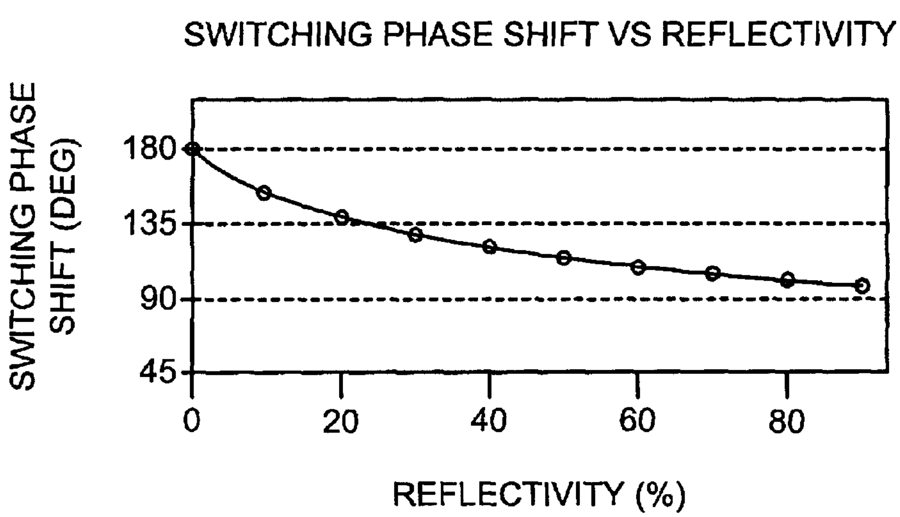
FIG. 6 is a diagram illustrating the phase shift of an exemplary optical switching device as a function of the reflectivity of the reflecting surfaces of the optical switching device's optical cavity.

FIG. 6 illustrates the performance of optical switching device 10 (FIG. 4) as a function of the reflectivity of optical cavity 12 (FIG. 4), simulated according to one embodiment of the present invention. The vertical axis represents the single-pass phase shift of optical switching device 10 (FIG. 4) required to transition between a maximum and minimum transmission of output optical signal 16 (FIG. 4). The horizontal axis represents the reflectivity of reflective gratings 44 and 45 (FIG. 4). Referring to FIG. 4, when the reflectivity is zero, in effect there is no optical cavity. Thus, in this case, optical switching device 10 is equivalent to a MZI device. Referring back to FIG. 6, the graph shows that a 180-degree single-pass phase shift is required, just as in a conventional MZI device. As reflectivity increases, the required single-pass phase shift decreases. At about 90% reflectivity, the required phase shift is about 90 degrees. A 90% reflectivity is relatively easy to achieve in a reflective grating.

A thermo-optic optical switching device according to the present invention is substantially similar to optical switching device 10 (FIG. 4) except that waveguide 49 would have a propagation medium with a refractive index that varies with temperature instead of electro-magnetic field. For example, waveguide 49 can be implemented with a silica ($SiO_2$) propagation medium. In addition, the phase shifter would have heater elements instead of electrodes 48A and 48B. For example, the heater element(s) can be resistor(s) placed near or in contact with arm 28A. This thermo-optic implementation operates in substantially the same manner as optical switching device 10 (FIG. 4). In view of the present disclosure, one skilled in the art can also design a stress/strain-optic implementation without undue experimentation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An optical switching device, comprising:

an optical cavity having an input port and an output port; and a phase modulator disposed within the optical cavity, the phase modulator, comprising:

a phase modulator input port and a phase modulator output port respectively coupled to the input port and the output port of the optical cavity;

a first optical combiner coupled to the phase modulator input port; and a second optical combiner coupled to the phase modulator output port, wherein the phase modulator introduces a phase shift in a portion of an optical signal propagating in the optical cavity in one direction, and introduces a phase shift in another portion of the optical signal propagating in another direction.

2. The optical switching device of claim 1, wherein the phase modulator comprises a Mach-Zehnder interferometer (MZI).

3. The optical switching device of claim 2, wherein the phase modulator comprises an electro-optic phase shifter.

4. The optical switching device of claim 2, wherein the phase modulator comprises a thermo-optic phase shifter.

5. The optical switching device of claim 2, wherein the phase modulator comprises a stress-optic phase shifter.

6. The optical switching device of claim 2 wherein the first and second optical combiners are each a Y-coupler.

7. The optical switching device of claim 2, wherein a first reflective facet and a second reflective facet are used in implementing the optical cavity.

8. The optical switching device of claim 7, wherein the first facet comprises a coating having a plurality of adjoining layers, each layer having an index of refraction that is different from that of an adjoining layer, the refractive indices alternating between higher and lower refractive indices.

9. The optical switching device of claim 7, wherein the first facet comprises a reflective grating.

10. An optical switching device, comprising:

an optical cavity having an input port and an output port; and means, disposed within the optical cavity, for modulating a phase of a portion of an optical signal propagating in the optical cavity, the means for modulating including a first optical combiner, disposed within the optical cavity, coupled to the input port and a second optical combiner, disposed within the optical cavity, coupled to the output port.

11. The optical switching device of claim 10, wherein the means for modulating comprises a Mach-Zehnder interferometer (MZI).

12. The optical switching device of claim 11, wherein the means for modulating comprises an electro-optic phase shifter.

13. The optical switching device of claim 11, wherein the means for modulating comprises a thermo-optic phase shifter.

14. The optical switching device of claim 11, wherein the means for modulating comprises a stress-optic phase shifter.

15. The optical switching device of claim 11 wherein the first and second optical combiners are each a Y-coupler.

16. The optical switching device of claim 11, wherein a first reflective facet and a second reflective facet are used in implementing the optical cavity.

17. The optical switching device of claim 16, wherein the first facet comprises a coating having a plurality of adjoining layers, each layer having an index of refraction that is different from that of an adjoining layer, the refractive indices alternating between higher and lower refractive indices.

18. The optical switching device of claim 16, wherein the first facet comprises a reflective grating.

19. A planar integrated optical circuit, comprising:

a first facet having a reflectance less than one;

a second facet having a reflectance less than one;

a first optical combiner coupled to the first facet;

a second optical combiner coupled to the second facet;

a first arm having one end coupled to the first optical combiner and another end coupled to the second optical combiner;

a second arm having one end coupled to the first optical combiner and another end coupled to the second optical combiner; and a phase shifter operatively coupled to the first and second arms.

20. The planar optical integrated optical circuit of claim 19, wherein the first and second facets each comprise a reflective grating.

21. The planar optical integrated optical circuit of claim 19, wherein the phase shifter is an electro-optic phase shifter, a thermo-optic phase shifter, or a stress-optic phase shifter.

22. A method, comprising:

propagating an optical signal into an optical cavity through a first input port disposed within the optical cavity;

causing a portion of the optical signal to propagate in one optical path and another portion of the optical signal to propagate in another optical path using a first optical combiner coupled to the first input port;

selectively introducing a phase difference between the portions of the optical signal within the optical cavity;

combining the portions of the optical signal using a second optical combiner; and propagating a portion of the combined signal out of the optical cavity through an output port coupled to the second optical combiner.

23. The method of claim 22, wherein the optical cavity is a resonant optical cavity with respect to the optical signal.

24. The method of claim 22 wherein a reflective grating is used to form a part of the optical cavity.

25. The method of claim 22, wherein a Mach-Zendher Interferometer (MZI) is used to selectively introduce the phase difference.

26. The method of claim 25, wherein the MZI comprises a phase shifter selected from the group comprising an electro-optic phase shifter, a thermo-optic phase shifter, or a stress-optic phase shifter.

27. An optical switching device, comprising:

an optical cavity;

means for propagating an optical signal into the optical cavity;

a first optical combiner, wherein the first optical combiner causes a portion of the optical signal to propagate in one optical path and another portion of the optical signal to propagate in another optical path, coupled to the means for propagating an optical signal into the optical cavity;

means for selectively introducing a phase difference between the portions of the optical signal disposed within the optical cavity;

a second optical combiner to combine the portions of the optical signal; and means for propagating a portion of the combined signal out of the optical cavity coupled to the second optical combiner.

28. The optical switching device of claim 27 wherein a reflective grating is used to form a part of the optical cavity.

29. The optical switching device of claim 27, wherein the means for selectively introducing a phase difference comprises a Mach-Zendher Interferometer (MZI).

30. The optical switching device of claim 29, wherein the MZI comprises a phase shifter selected from the group comprising an electro-optic phase shifter, a thermo-optic phase shifter, or a stress-optic phase shifter.

* * * * *